April 25, 1961 E. G. VANDERBILT 2,981,254
APPARATUS FOR THE GAS DEFLATION OF AN ANIMAL'S STOMACH
Filed Nov. 12, 1957
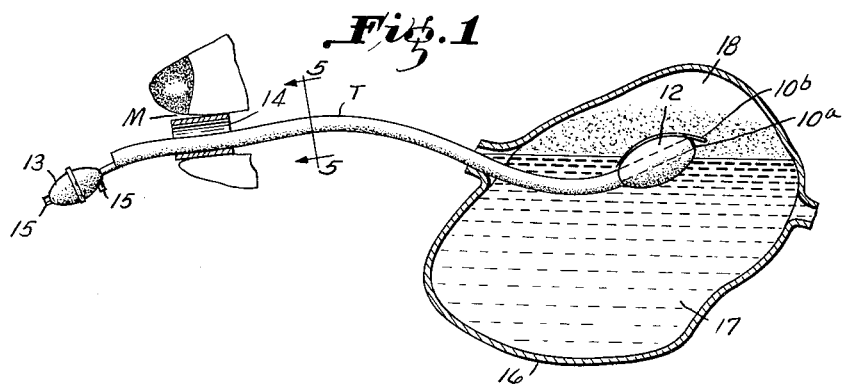
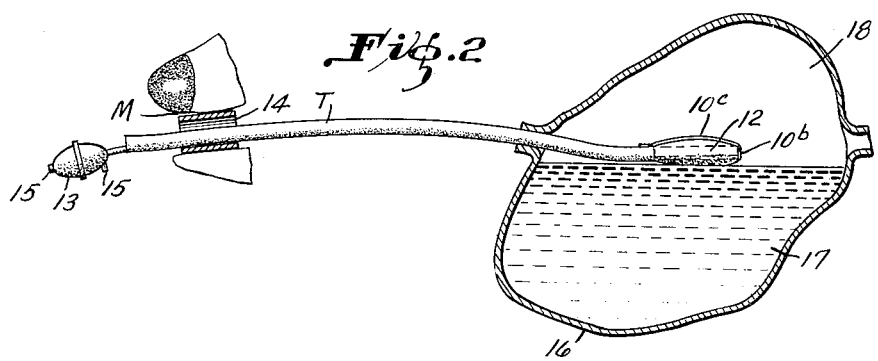
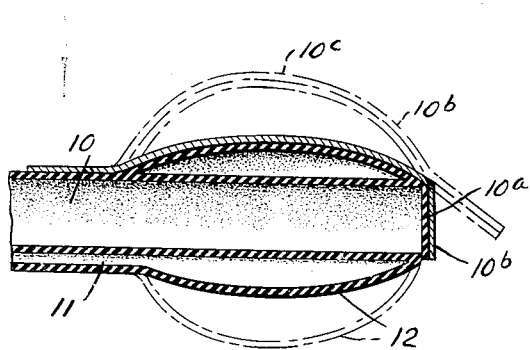
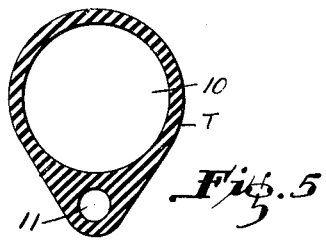
INVENTOR
EDWIN G. VANDERBILT
BY M. Y. Charles
ATTORNEY United States Patent Office 2,981,254
Patented Apr. 25, 1961

2,981,254

APPARATUS FOR THE GAS DEFLATION OF AN ANIMAL'S STOMACH

Edwin G. Vanderbilt, Severy, Kans.

Filed Nov. 12, 1957, Ser. No. 695,749

1 Claim. (Cl. 128—350)

My invention relates to an apparatus for stomach deflating devices for livestock, such as cattle, sheep, etc.

It is a well known fact that livestock, such as above mentioned, if allowed to graze on fresh alfalfa, sweet clover and the like, while it is wet or heavy with dew, the stomach of the animal will become overloaded and fill up above the intake and vent of the stomach and then a gas will develop that will inflate the stomach and if the pressure is not relieved, it will soon cause the death of the animal.

The object of this invention is to relieve this stomach pressure and save the life of the animal.

Now referring to the accompanying drawings in which similar numerals of reference designate the same parts throughout the several figures of the drawings:

Fig. 1 is a side view of the stomach deflating device, the device being shown as having been inserted in the stomach of the animal while the stomach is inflated with the gas pressure.

Fig. 2 is a side view of the stomach deflating device and illustrating the position of the device in the stomach following the deflation of the stomach and just prior to the removal of the device from the stomach.

Fig. 3 is a side view of a modified form of the device.

Fig. 4 is a detail sectional view of the stomach entering end of the device as shown in Figs. 1 and 2 and illustrating the inflated and deflated float bag portion of the device.

Fig. 5 is a detail sectional view through the tube portion of the device, the view being as seen from the line 5—5 in Fig. 1, and looking in the direction of the arrows.

In the drawings of the device as shown in Figs. 1, 2, 4 and 5, the device consists of a rather long flexible duplex tube T having two passages 10 and 11 therethrough, one passage 10 is a rather large passage, perhaps an inch in diameter, while the other passage 11 is a small passage, perhaps ⅛ inch in diameter. At one end of the small passage 11 is a thin walled inflatable bag 12, that may be inflated with air through the small passage 11, as and for the purpose that will later be described.

The thin walled, inflatable bag 12 surrounds the end portion of the large tube 10, a little bit in rear of the extreme end 10a thereof. The extreme end of the tube 10a has a flap 10b that closes the end 10a of the tube 10. The device is further provided with a substantially non-elastic tape 10c which lays across the bag 12 and one end of the tape 10c is attached to the loose end of the flap 10b while the other end of the tape 10c is attached to the outside of the tube 10 for purposes that will later be made obvious.

At the other end of the passage 11 is a pump bulb 13 for the purpose of inflating the bag 12 as will later be described.

The device further includes a mouth or guide tube 14 through which the tube T may be passed. The pump bulb 13 has a valve 15 at each end for receiving and passing air through the passage 11 into the bag 12. These bulbs and valves are used in numerous devices for the same purpose, therefore the valve structure is not explained in detail in this disclosure.

The device as shown in Fig. 3 is substantially the same as shown in Figs. 1 and 2 and as above described, the only difference being that one wall of the bag 12 is attached to the under side of the tube end portion 10a instead of surrounding the tube 10 as shown in Figs. 1 and 2.

The end 10a of the tube 10 is provided with the flap 10b the same as shown in Figs. 1 and 2, the flap 10b constitutes a valve for opening and closing the end 10a of the tube 10, as will later be explained.

All of the devices shown in Figs. 1, 2 and 3 are provided with a mouth piece 14 that consists of a tubular element large enough in diameter that the deflation tube T may be easily passed therethrough. The mouth piece 14 is also long enough that it may be entered into the mouth M of the animal and reach to the throat portion of the animal so that the tube T may be entered through the mouth piece 14 and be easily slipped on through the throat and into the stomach of the animal. The mouth piece 14 also serves as a guide through the animal's mouth M to prevent the animal from using its tongue to push the tube T between its teeth and biting the tube in two or holding the tube so it cannot be advanced on into the stomach.

To use the device, the entire length of the the tube T, including the bag 12 would be oiled with castor oil or some similar lubricant, after which the mouth piece 14 would be inserted in the mouth and into the throat of the animal, whereupon the bag end of the tube would be passed through the mouth piece 14 to the throat of the animal and into the inflated stomach 16, whereupon bulb 13 would be squeezed by hand several times until the bag 12 becomes inflated with air, whereupon the bag 12 increases in size and simultaneously with the increasing in size, the bag presses against the tape 10c which in turn pulls the flap 10b from over the tube end 10a, also with the inflating of the bag 12 the bag becomes a float and will rise in the liquid content 17 of the stomach to such a point that the passage 10 would be raised into the gas pocket 18, whereupon the gas would exhaust through the passage 10 of the tube T to relieve the gas pressure in the stomach 16 of the animal, after which the valve 15 may be opened to exhaust the air from the bag 12 and deflate the bag 12, whereupon the tube T and bag 12 may be pulled from the stomach 16 of the animal and the stomach 16 will resume its normal shape and position as shown in Fig. 2, whereupon the normal digestive processes will take place and the life of the animal has been saved.

While the above described device as shown and described is probably the preferred form of the device, it is to be understood that such modifications of the device may be employed as lie within the scope of the appended claim without departing from the spirit and intention of the invention. Now having fully shown and described my invention, what I claim is:

A stomach deflating device for animals; said device having a flexible bi-tubular element; one of said tubes being larger in diameter than the other; inflatable float means; said inflatable float means being attached to one end of the bi-tubular element and being connected with the smaller of the said tubes for inflation and deflation purposes to raise and lower the adjacent end of the larger of said tubes above the liquid level in an animal's stomach; and pump means on the other end of the smaller of said tubes for inflating and deflating the said inflatable and deflatable float means; valve means on the larger of said tubes and adjacent the said float means; said valve means being operable to open and close the larger of said tubes by the movement of said float device upon the inflation and deflation thereof.

References Cited in the file of this patent

UNITED STATES PATENTS

| 631,646 | Lauer | Aug. 22, 1899 |
| 2,498,692 | Mains | Feb. 28, 1950 |
| 2,677,375 | Raiche | May 4, 1954 |

FOREIGN PATENTS

| 60,874 | Switzerland | Sept. 20, 1912 |
| 197,713 | Switzerland | June 16, 1937 |